(12) United States Patent
Nikles et al.

(10) Patent No.: US 10,536,788 B2
(45) Date of Patent: Jan. 14, 2020

(54) HEARING AID, IN PARTICULAR BEHIND-THE-EAR HEARING ASSISTANCE AID

(71) Applicant: SIVANTOS PTE. LTD., Singapore (SG)

(72) Inventors: Peter Nikles, Erlangen (DE); Sebastian Suedekum, Magdeburg (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 16/004,631

(22) Filed: Jun. 11, 2018

(65) Prior Publication Data

US 2018/0359576 A1 Dec. 13, 2018

(30) Foreign Application Priority Data

Jun. 9, 2017 (DE) .......................... 10 2017 209 813

(51) Int. Cl.
*H04B 5/00* (2006.01)
*H04R 25/00* (2006.01)

(52) U.S. Cl.
CPC ..... *H04R 25/554* (2013.01); *H04R 2225/021* (2013.01); *H04R 2225/33* (2013.01); *H04R 2225/51* (2013.01)

(58) Field of Classification Search
CPC combination set(s) only.
See application file for complete search history.

(56) References Cited

U.S. PATENT DOCUMENTS

| 8,344,689 | B2 | 1/2013 | Boguslavskij |
| 8,644,542 | B2 | 2/2014 | Klemenz et al. |
| 9,191,757 | B2 | 11/2015 | Bauman et al. |
| 10,320,211 | B2 | 6/2019 | Hatanaka et al. |
| 2007/0222681 | A1* | 9/2007 | Greene ............... H01M 2/1022 343/700 MS |
| 2013/0188803 | A1* | 7/2013 | Shaanan ............... H04R 5/033 381/74 |
| 2013/0328524 | A1* | 12/2013 | Bartulec ............... H02J 50/00 320/108 |
| 2015/0016645 | A1 | 1/2015 | Bauman et al. |
| 2015/0036854 | A1 | 2/2015 | Polinske et al. |
| 2016/0277879 | A1* | 9/2016 | Daoura ............... H04W 4/029 |
| 2016/0322857 | A1 | 11/2016 | Itagaki et al. |
| 2016/0365751 | A1 | 12/2016 | Hatanaka et al. |
| 2017/0150280 | A1 | 5/2017 | Christensen et al. |

FOREIGN PATENT DOCUMENTS

| DE | 102008007822 A1 | 8/2009 |
| DE | 102008023352 A1 | 11/2009 |
| EP | 2672733 A1 | 12/2013 |
| EP | 2824942 A1 | 1/2015 |
| EP | 3113316 A1 | 1/2017 |
| JP | 2009021910 A | 1/2009 |

(Continued)

*Primary Examiner* — Amir H Etesam
(74) *Attorney, Agent, or Firm* — Laurence A. Greenberg; Werner H. Stemer; Ralph E. Locher

(57) ABSTRACT

A hearing aid, in particular a behind-the-ear hearing assistance aid, contains a transmitting and/or receiving unit having an antenna element for wireless signal transmission and for wireless energy transfer to an energy store. The antenna element is formed as a foil structure, which at least sectionally encloses the energy store.

10 Claims, 7 Drawing Sheets

(56) References Cited

FOREIGN PATENT DOCUMENTS

| | | |
|---|---|---|
| JP | 2013196883 A | 9/2013 |
| JP | 2015073167 A | 4/2015 |
| JP | 2015159664 A | 9/2015 |
| JP | 2016213224 A | 12/2016 |
| WO | 2011031223 A1 | 3/2011 |
| WO | 2017153274 A1 | 9/2017 |

\* cited by examiner

HEARING AID, IN PARTICULAR BEHIND-THE-EAR HEARING ASSISTANCE AID

CROSS-REFERENCE TO RELATED APPLICATION

This application claims the priority, under 35 U.S.C. § 119, of German application DE 10 2017 209 813.9, filed Jun. 9, 2017; the prior application is herewith incorporated by reference in its entirety.

BACKGROUND OF THE INVENTION

Field of the Invention

The invention relates to a hearing aid, in particular a behind-the-ear hearing assistance aid, containing a transmitting and/or receiving unit having an antenna element for wireless radio communication and for inductive energy transfer of an energy store. The hearing aid is preferably a hearing assistance aid.

Persons who suffer from a reduction of the hearing ability use a hearing aid as an assistance instrument or hearing assistance aid. In this case, the sound or a sound signal of the surroundings is acquired via an electromechanical sound transducer, which converts the sound or the sound signal into an electrical signal (audio signal). The electrical signal is processed by an amplifier circuit and converted by a further electromechanical transducer into an amplified sound signal, which is introduced into the auditory canal of the person.

Different embodiments of hearing aids are known. Thus, so-called "behind-the-ear aids" are worn between the skull and the pinna, wherein the amplified sound signal is introduced by a sound tube into the auditory canal of the person. A further embodiment of a hearing aid is an "in-ear aid", in which the hearing aid itself is introduced into the auditory canal. As a consequence, the auditory canal is at least partially closed, and therefore with the exception of the sound signal generated by the hearing aid, no further sound or only very damped sound can penetrate into the auditory canal.

If the person suffers from an impairment of the hearing ability of both ears, a hearing aid system containing two such hearing aids as hearing assistance aids is used, wherein one of the two hearing aids is associated respectively with each ear. To enable three-dimensional hearing for the person, it is necessary for the audio signals acquired using a hearing aid to be provided to the respective other hearing aid. A typically wireless radio communication takes place between the two hearing aids in this case by an antenna (antenna element).

The respective hearing aid is operated by a rechargeable energy store introduced into the hearing aid housing. The hearing aid can be introduced into a charging station, which is inductively coupled to a charging device of the hearing aid and thus transfers energy wirelessly to the energy store, for the purpose of charging the energy store. Eddy currents, which cause undesired heat development, are induced in this case during the charging procedure because of a magnetic alternating field in the metallic shells of the energy store.

SUMMARY OF THE INVENTION

The invention is based on the object of specifying a particularly suitable hearing aid, in which the energy store is inductively charged using the most space-saving means possible. In this case, in particular a heat development in the energy store due to eddy current losses because of the magnetic alternating field is to be avoided as much as possible.

The hearing aid is preferably a hearing assistance aid containing an aid housing and having a (housing-internal) transmitting and/or receiving unit arranged therein, which has an antenna element electrically contacted with an electronics unit, for example, with an integrated circuit for signal processing. The antenna element is used for wireless signal transmission, in particular for radio communication with a second hearing aid, and therefore the two hearing aids are at least sometimes coupled to one another in a signaling manner. By radio communication, in particular data and/or settings are transferred between the two hearing aids, wherein the data transfer expediently takes place inductively.

Alternatively or in combination, a remote control can be associated with the hearing aid which is coupled in a signaling manner with the hearing aid or possibly with the two hearing aids for the wireless radio communication. In this case, an inductive transfer of data again expediently takes place, for example configuration data.

In particular, the or each of the hearing aids is provided and configured for the purpose of being inserted at least partially into the auditory canal of a user. A rechargeable energy store, for example a lithium-ion rechargeable battery, which is arranged in the aid housing or in the hearing aid or is introduced therein, is used for the energy supply of the hearing aid. In this case, the antenna element is additionally used for inductive energy transfer, and therefore wireless charging of the energy store of the hearing aid is possible in a certain operating mode by the antenna element.

The energy store has essentially parallel end sides spaced apart from one another (end side faces) and a circumferential region, which is formed in a suitable manner from a circumferential jacket surface perpendicular to the end side faces of the energy store.

The antenna element is formed as a foil structure and encloses the energy store at least in sections. The foil structure has a first and a second and also a third foil element for this purpose. In this case, the first and the second foil element are each arranged on the end sides of the energy store.

In one suitable refinement, the first and/or the second foil element at least partially overlap the end side face of the respective end side. The first and/or second foil element can have a ring shape in this case, for example. The first and/or the second foil element preferably overlap at least half of the end side face of the respective end sides of the energy store and are preferably embodied as planar in this case. In other words, the first and second foil element have a small foil thickness (perpendicular to the end sides of the energy store) in relation to the extension thereof parallel to the end face.

In the installed state, the third foil element extends transversely to the first and second foil element and preferably overlaps only a comparatively small section of the circumferential region of the energy store. In this case, the third foil element expediently forms a coil core of the antenna element extending in the transverse direction to the first and second foil element. The coil core of the antenna element is provided with a wire or coil winding made of a number of turns.

The turns of the wire or coil winding can enclose the coil core on the circumference, for example, along the complete extension in the transverse direction, i.e., in the longitudinal direction of the third foil element. However, the coil core preferably protrudes out of the wire or coil winding at least on one side, preferably on both sides. The wire or coil winding is electrically contacted with an electronics unit in a suitable manner. The antenna element forms a secondary coil of a transformer in this case.

The first, second, and third foil elements of the foil structure are formed coherently in an advantageous embodiment. In one conceivable embodiment, the foil elements can also be produced as individual parts, which are only connected to one another in the final assembled state, for example.

Because of the arrangement of the first and the second foil element on the end faces of the energy store oriented essentially parallel and as a consequence of the arrangement of the third foil element on the circumferential region of the energy store essentially perpendicular to the end faces, the antenna element forms a U shape. In this case, because of the angling (folding) of the first foil element and the second foil element in relation to the third foil element and the wire or coil winding and because of the formation of the antenna element as a foil having the smallest possible foil thickness, the space requirement is reduced, and therefore a comparatively compact antenna element is provided, which can therefore also be housed in the aid housing of the hearing aid, which only offers little installation space.

The antenna element is manufactured from a ferromagnetic and/or ferrimagnetic material. The antenna element is suitably formed from a ferrite. The first foil element and the second foil element of the foil-like antenna element advantageously consist of the same material as the third foil element.

In one suitable refinement, a shield is arranged between the foil structure of the antenna element and the energy store, in particular between the first foil element and the energy store and between the second foil element and the energy store. In this case, the shield is formed from a diamagnetic and/or paramagnetic material or contains diamagnetic and/or paramagnetic material preferably having high conductivity, for example, copper or aluminum. The shield is suitably also a foil or is formed from a foil.

The antenna element advantageously has a high sensitivity and a high quality, wherein the antenna element acts like a ferrite rod antenna having a comparatively large end face. Propagation of the magnetic field lines toward the energy store from the side of the first and second foil elements facing toward the energy store is avoided by the shield. The permeability of the foil structure of the antenna element is preferably greater than the permeability of the shield, and the electrical conductivity of the material of the shield is expediently greater than the electrical conductivity of the foil structure of the antenna element. As a consequence, eddy currents are induced at most and only slightly in the shield, while in contrast the magnetic field lines in the foil structure penetrate into the antenna element and therefore essentially extend therein. As a result thereof, the effective permeability and the sensitivity of the antenna element are elevated.

In one preferred embodiment, the shield completely covers the end sides of the energy store. The shield is at least partially covered in this case by the foil structure of the antenna element. In other words, with the exception of the region in which the third foil element is coupled to the first and second foil elements of the antenna element, the shield is completely covered by the foil structure of the antenna element. The circumference of the antenna element therefore aligns with the circumference of the shield. Alternatively, the foil structure is reduced in size in relation to the shield, and therefore a projection of the foil structure on the shield is completely covered thereby.

The sensitivity and the quality of the antenna element are adaptable to requirements occurring in operation by the embodiment of the foil structure in relation to the shield. For example, a first and second foil structure reduced in size in relation to the shield causes an improved quality of the antenna element with reduced sensitivity. In addition, a shield can be arranged between the third foil element and the energy store, whereby the sensitivity and the quality of the antenna element are further adaptable to requirements occurring in operation.

A propagation of the magnetic field lines toward the energy store from the side of the first and second foil elements facing toward the energy store is avoided by the shield and by the foil structure. In this case, eddy current losses due to an operationally related magnetic alternating field, in particular one caused by the charging procedure of the energy store, are induced at most and only slightly in the shield. As a consequence thereof, eddy current losses and heating induced thereby in the energy store arranged between the shield are particularly advantageously avoided, whereby damage to the energy store is avoided and a lengthened service life of the energy store is provided.

A space-saving embodiment is formed by the arrangement of the antenna element practically directly on the energy store and by the arrangement of the shield between the foil structure of the antenna element and the energy store. As a consequence thereof, the hearing aid can be embodied smaller, or additional components can be introduced into the hearing aid. If the energy store is formed from the material of the shield, no separate shield has to be provided for introduction between the foil structure and the energy store.

The first and second foil elements of the foil structure of the antenna element and the shield are advantageously embodied as planar and therefore particularly effective. Furthermore, the magnetic field lines penetrate into the antenna element due to the shield and extend essentially in the antenna element. In addition, because of the greater permeability of the antenna element in relation to the shield and the greater conductivity of the shield in relation to the antenna element, eddy current losses in the antenna element are avoided. The sensitivity and the quality of the antenna element are thus advantageously improved. As a consequence thereof, the energy transfer by means of the magnetic alternating field to the energy store is improved, and the alignment or positioning of the hearing aid with respect to the charging device can be more arbitrary.

In one conceivable embodiment, the first and the second foil elements of the foil structure are arranged over further regions of the hearing aid, for example, also over the entire hearing aid. Because of the foil-type embodiment, the antenna element is thus enlarged in a space-saving and cost-effective manner, whereby a bandwidth and also the quality and sensitivity of the antenna element can be adapted to the operational requirements.

In one suitable refinement, the shield is integrated into an in particular flexible printed circuit board. The flexible printed circuit board has three coherent regions in this case, on which the first, the second, and/or the third foil element of the foil structure are arranged. The printed circuit board advantageously bears an electronic hearing aid component in this case on the board surface facing toward the energy store, in particular the transmitting and/or receiving unit, or, for example, a charging electronics unit in the form of a charging chip, a radio system chip, and/or terminals for the energy store.

The hearing aid component is suitably arranged in this case on the board surface facing toward the energy store, essentially centrally on a region of the printed circuit board against which the first and second foil elements of the foil structure of the antenna element press. The hearing aid component is thus essentially positioned in a field-free manner and has little or only minor interference because of the magnetic fields. Such a hearing aid component also does not interfere with a signal-to-noise ratio of the antenna during operation or only does so to a comparatively small extent, i.e., the antenna and the hearing aid component have comparatively little crosstalk.

In particular as a result of the shield, possible magnetic fields are shielded which are induced, for example, as a result of a current-conducting electrical conductor or a conductor track of the hearing aid component. A stable production of the shield is advantageously provided by the integration of the shield into an in particular flexible printed circuit board. In addition, the hearing aid component is attachable in a simple and cost-effective manner to the printed circuit board, for example by reflow soldering.

The formation of the antenna element from a flexible foil and the introduction of the shield into a flexible printed circuit board particularly advantageously enable simple and failsafe installation of the antenna element and the shield. The installation takes place in this case starting from a planar form by angling the first and second foil elements of the foil structure and the shield arranged thereon. The angling (buckling or folding) of the first and second foil elements of the foil structure and the regions of the flexible printed circuit board arranged thereon takes place such that the first and second foil elements of the foil structure and the shield press against the end sides of the energy source.

In one expedient embodiment, the foil structure of the antenna element is at least partially integrated into a printed circuit board (circuit board) bearing at least one of the hearing aid components. In particular, the third foil element of the foil structure is introduced into the circuit board. The wire or coil winding about the third foil element forming the coil core of the antenna element is produced in this case from conductor tracks of the circuit board, whereby a complex and sensitive winding of the wire or coil winding is avoided.

According to one advantageous embodiment, the energy store is at least partially enclosed by a collar-like jacket shield. In other words, the jacket shield has a width which is at most the width of the circumferential region. The jacket shield is arranged in the middle between the shield attached to the first and the second foil elements in this case and is not necessarily (electrically) closed. The jacket shield is arranged between the shield attached to the first and second foil elements of the foil structure and between the third foil element and the energy store. The jacket shield is preferably part of the shield, but is not necessarily (electrically) connected thereto.

A penetration of the magnetic field lines into the energy store is avoided due to the jacket shield, and therefore eddy current losses due to an operational magnetic alternating field, in particular during a charging procedure of the energy store, are induced if at all and only slightly in the shield. As a result, eddy current losses and heating of the energy store induced thereby are particularly advantageously avoided with the aid of the additional jacket shield. Because of the collar-like embodiment of the jacket shield, easy replaceability of the energy store is moreover ensured.

The advantages achieved by the invention are in particular that due to the particularly suitable arrangement and design of the antenna element and possibly of the shield around the energy store, during the inductive and wireless charging procedure of the hearing aid, the heat development in the energy store of the hearing aid as a result of eddy current losses of the magnetic alternating field is avoided. Furthermore, the space required in the aid housing and therefore in the hearing aid is reduced. As a result, the hearing aid can be embodied smaller, or additional components for further functionalities can be installed.

The hearing aid can be, for example, a receiver-in-the-canal hearing assistance aid (RIC hearing assistance aid), an in-the-ear (ITE) hearing assistance aid, an in-the-canal (ITC) hearing assistance aid, or a complete-in-canal (CIC) hearing assistance aid. The hearing assistance aid is particularly preferably a behind-the-ear-(BTE) hearing assistance aid, which is worn behind a pinna. The hearing aid may be part of a (binaural) hearing aid system, wherein one such hearing aid is associated with each ear of a person and data may be transmitted between the hearing aids by wireless radio communication.

Other features which are considered as characteristic for the invention are set forth in the appended claims.

Although the invention is illustrated and described herein as embodied in a hearing aid, in particular a behind-the-ear hearing assistance aid it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts corresponding to one another are provided with the same reference signs in all figures.

Figure 1:
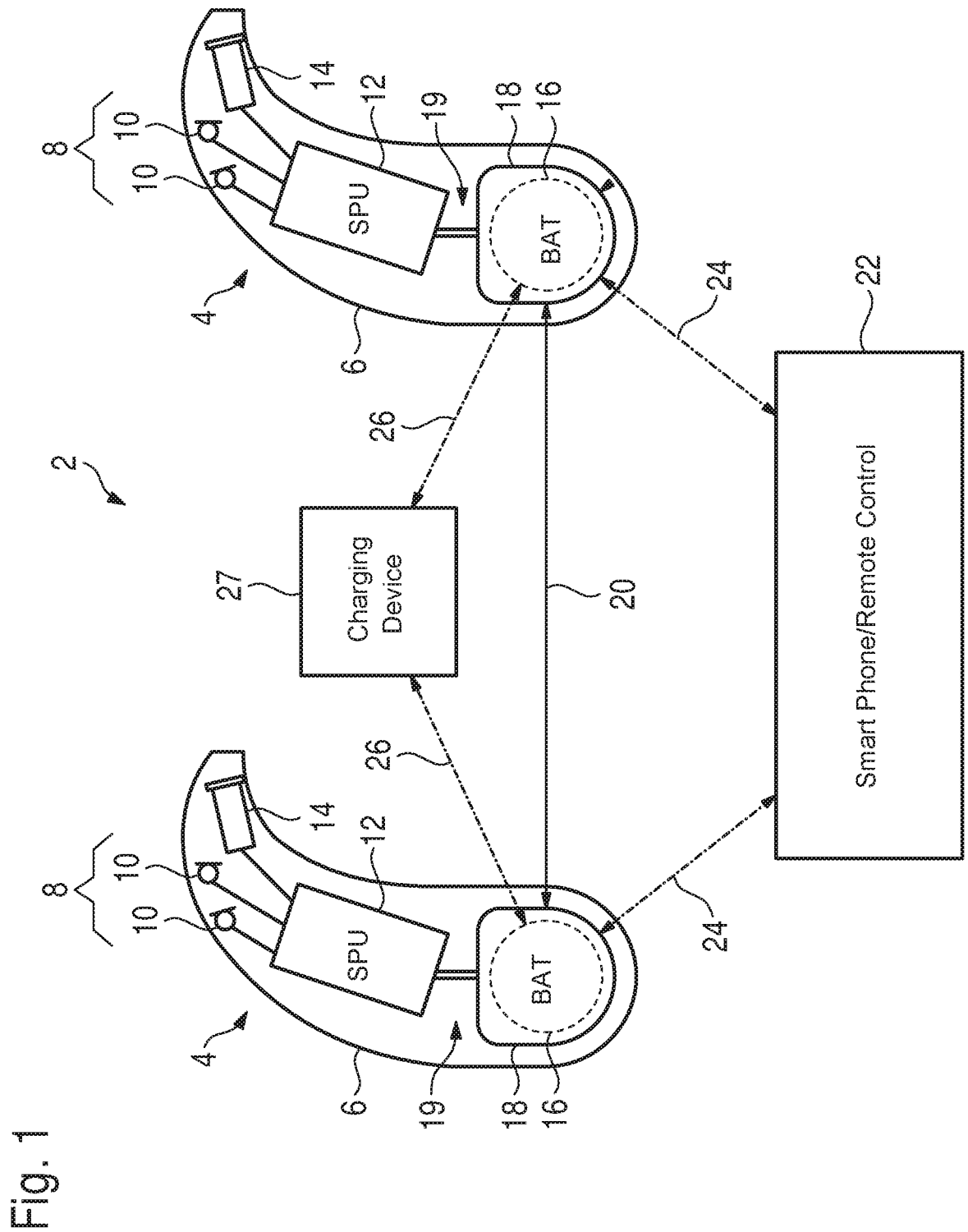
FIG. 1 is an illustration showing a hearing aid system having two hearing aids, which each contain an energy store and an antenna element according to the invention.

Referring now to the figures of the drawings in detail and first, particularly to FIG. 1 thereof, there is shown a (binaural) hearing assistance system 2 having two structurally equivalent hearing aids 4. The hearing aids 4 are provided as hearing assistance aids and are configured to each be worn behind one ear of a user (wearer). In other words, they are each behind-the-ear hearing aids (BTE hearing aid), which have a sound tube (not shown), which is inserted into the ear. The respective hearing aid 4 has a housing 6, manufactured from a plastic, for example. A microphone 8 having two electromechanical sound transducers 10 is arranged inside the housing 6. Changing a directional characteristic of the microphone 8 is enabled by two sound transducers 10, by way of a time delay of electrical signals, which are generated by the respective sound transducer 10 from acquired sound signals, being changed. The two electromechanical sound transducers 10 are coupled in a signaling manner to a signal processing unit 12, which includes an amplifier circuit. The signal processing unit 12 has electrical and/or electronic (active and/or passive) components and circuit elements.

Furthermore, a loudspeaker 14 is coupled in a signaling manner to the signal processing unit 12, by which the electrical signals of the sound transducer 10 processed by the signal processing unit 12 are again output as sound signals. These sound signals are conducted by the non-illustrated sound tube into the ear of a user of the hearing aid system 2.

The power supply (voltage and current supply) of the signal processing unit 12, the microphone 8, and the loudspeaker 14 of each hearing aid 4 takes place by means of a rechargeable energy store 16 (shown by dashed lines). Each of the hearing aids 4 furthermore has an antenna element 18 of a transmitting and/or receiving unit 19, with the aid of which a wireless radio communication 20 between the two hearing aids 4 is enabled. The antenna element 18 partially encloses the energy store 16 in this case. The wireless radio communication 20 is used for exchanging data and takes place inductively. Providing the wearer of the hearing aids 4 with a three-dimensional hearing sensation, for example, is enabled because of the exchange of the data.

Furthermore, a further device 22 is shown in the embodiment of FIG. 1, which is, for example, a remote control or a smart phone. It has a communication unit (not shown in greater detail), using which a further wireless radio communication, which is indicated by means of the dot-dash arrows 24, is established with the two antenna elements 18 of the two hearing aids 4. The wireless radio communication is used for the exchange of data between the further device 22 and the hearing aids 4.

In addition, the antenna element 18 is used for the inductive and wireless energy transfer, as symbolized by the dot-dash arrows 26, from a charging device 27 to the hearing aid 4, and therefore in a specific operating mode, charging of the rechargeable energy store 16 of the hearing aid 4 is enabled by the antenna element 18. In other words, energy, which is used to charge the energy store 16, is transferred inductively by the antenna element 18.

Figure 2:
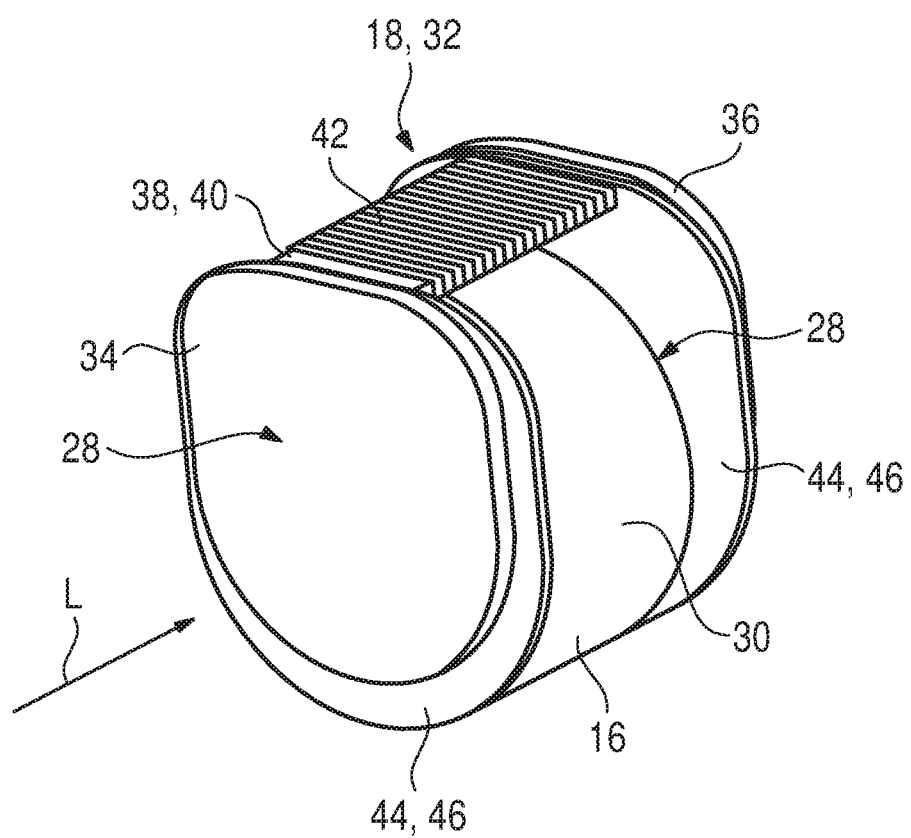
FIG. 2 is a perspective view of the energy store, which is covered on the end sides by the antenna element and by a shield.
Figure 4:
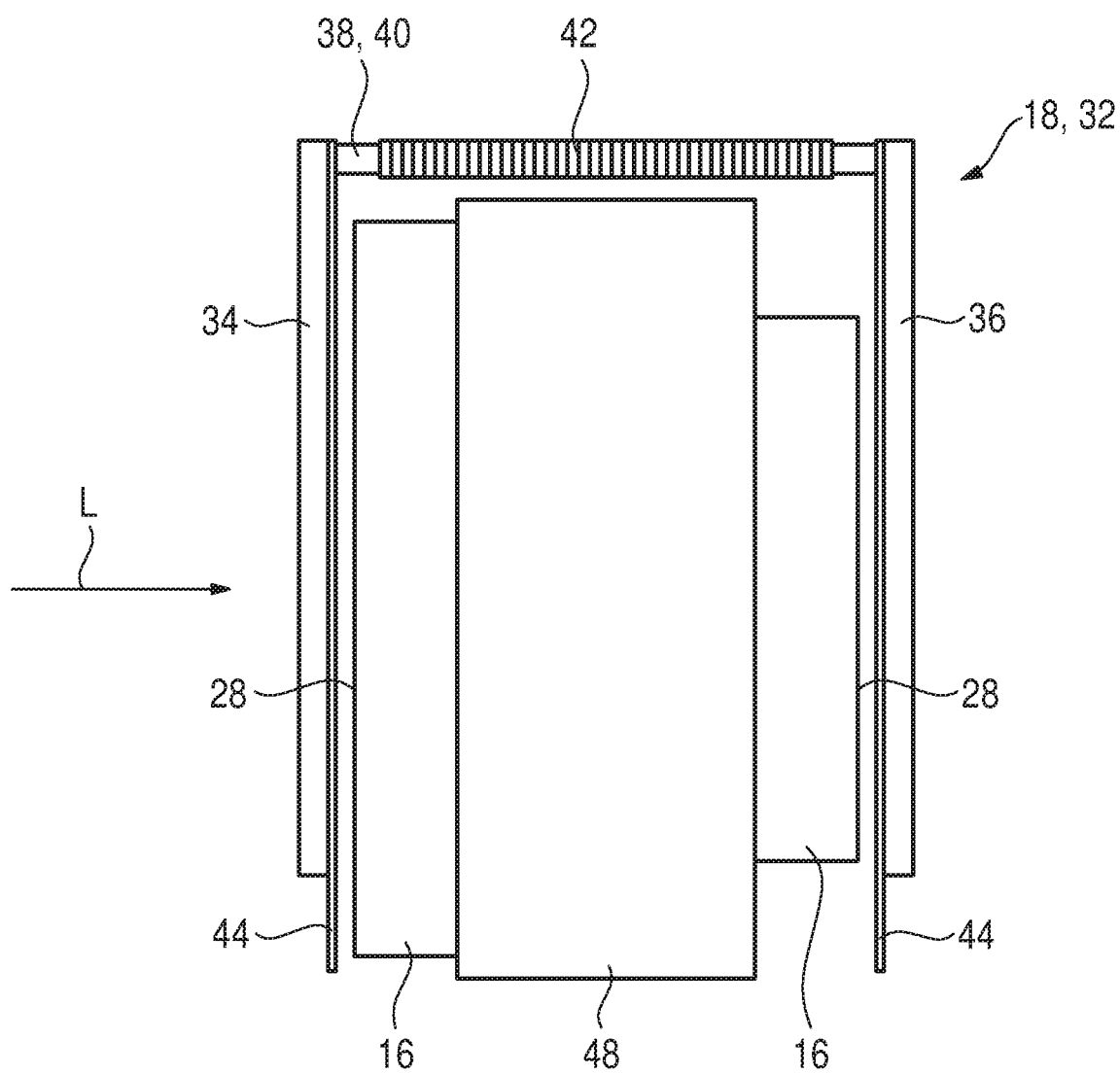
FIG. 4 is a side view of the energy store according to FIG. 3 having only partially enclosed circumferential region.
Figure 7:
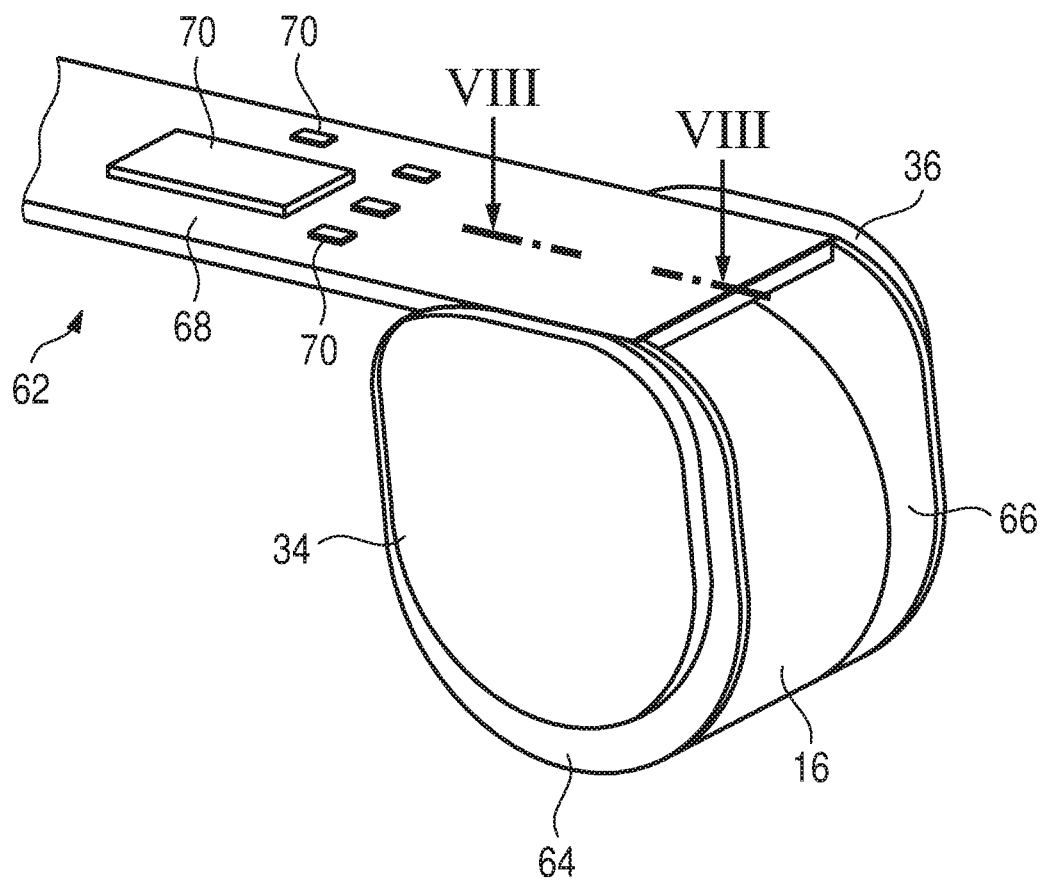
FIG. 7 is a perspective view of a hearing aid circuit board bearing electronic components, in which the antenna element is partially integrated.

FIGS. 2, 4, and 7 show an energy store 16 in a perspective view, which has a shape which corresponds to two coaxially mounted cylinders arranged one on top of another, having a longitudinal direction L parallel to the cylinder axes. The opposing and spaced-apart planar surfaces of the cylinders form parallel end sides or end faces 28 of the energy store 16. The jacket surfaces of the two cylinders form a circumferential region 30 of the energy store 16.

The antenna element 18 is formed as a foil structure 32 from a ferromagnetic or ferrimagnetic material, wherein the end face of the end side 28 of the energy store 16 is partially covered, in particular more than half of the end face of the end side 28 is covered, by the antenna element 18. The antenna element 18 is embodied as a ferrite foil in FIG. 2. In this case, the foil structure 32 has a first and second foil element 34 and 36, respectively, and also a third foil element 38. The first and second foil elements 34 and 36 are arranged in parallel at the opposing end sides 28 of the energy store 16 and cover the end sides or end faces 28 of the energy store 16 at the same time.

The first foil element 34 of the foil structure 32 is structurally equivalent and symmetrical to the second foil element 36, wherein the plane of symmetry extends perpendicularly to the longitudinal direction L between the two foil elements 34 and 36. The third foil element 38 overlaps the circumferential region 30 of the energy store 16 and extends transversely to the first and second foil elements 34 and 36 in the longitudinal direction L. The third foil element 38 forms a coil core 40 of the antenna element 18 in this case and is provided with a wire or coil winding 42. The wire or coil winding 42 is electrically contacted with an electronics unit (not shown). The foil elements 34, 36, 38 of the foil structure form a U shape, wherein the first and the second foil elements 34, 36 form the U legs and the third foil element 38 forms the connecting leg of the U shape.

The foil elements 34, 36, 38 are preferably embodied as planar. In other words, the first and second and also the third foil element 34, 36, 38 have a small foil thickness perpendicular to the end sides 28 and/or to the circumferential region 30 of the energy store 16 in relation to the extension of the foil elements 34, 36, 38 parallel to the end face of the end side 28 and/or to the circumferential region 30.

Furthermore, a shield 44 is arranged in each case between the first and second foil elements 34 and 36 of the foil structure 32 of the antenna element 18 and the energy store 16. The shield 44 is formed from a diamagnetic or paramagnetic material or contains diamagnetic or paramagnetic material.

In the exemplary embodiment of FIG. 2, the shield 44 is embodied as a copper foil 46. The copper foil 46 is comparatively cost-effective and easily applicable, because of which production costs are reduced. The shield 44 is at least partially covered by the first and second foil elements 34 and 36 of the foil structure 32.

In this case, in the exemplary embodiment of FIG. 2, the foil structure of the first and second foil elements 34 and 36 is reduced in size in relation to the shield 44, and therefore a projection of the foil structure on the shield 44 along the longitudinal direction L, with the exception of a region in which the third foil element 38 is coupled to the first and second foil elements 34, 35 of the antenna element 18, is completely enclosed by the shield 44.

By arranging the antenna element 18 directly on the energy store 16 and by arranging the shield 44 between the foil structure 32 of the antenna element 18 and the energy store 16, a space-saving embodiment is formed. As a result thereof, the hearing assistance aid 4 can be embodied as particularly small. Alternatively, additional components can be introduced into the hearing assistance aid 4.

A sensitivity and a quality of the antenna element 18 are adapted by the embodiment of the shield 44 and the embodiment of the first and second foil element 34, 36 to the requirement necessary in operation, wherein the antenna element 18 acts like a ferrite rod antenna having a comparatively large end face. A propagation of magnetic fields toward the energy store 16 from the side of the first and second foil elements 34 and 36 facing toward the energy store 16 is avoided in this case due to the shield 44. Rather, these magnetic fields are pressed into the antenna element 18 and thus extend essentially therein, whereby the sensitivity of the antenna element 18 is improved.

Figure 3:
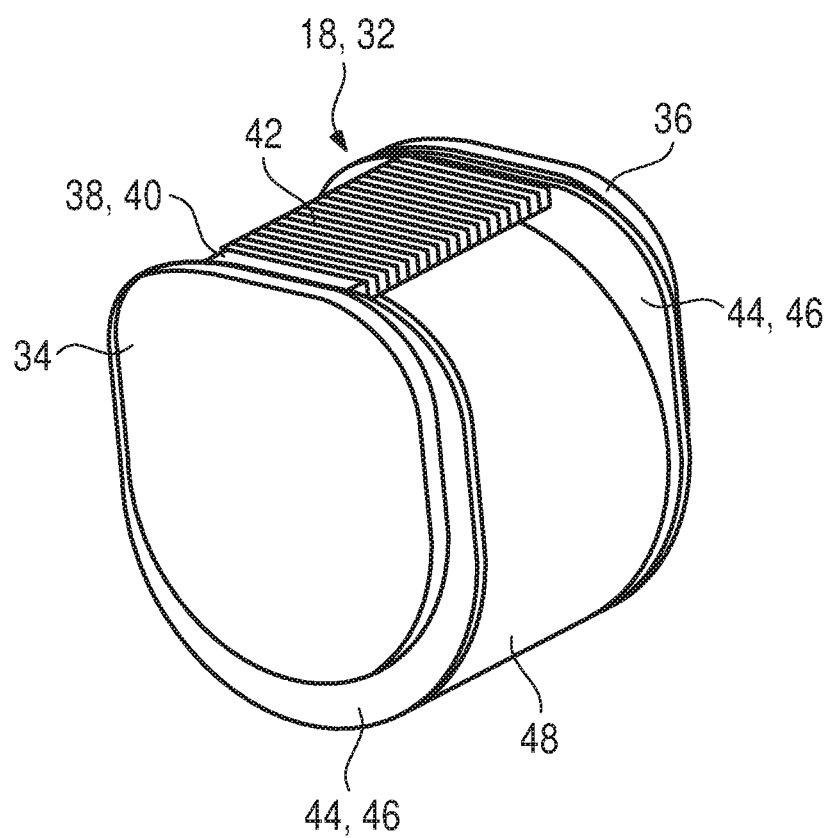
FIG. 3 is a perspective view according to FIG. 2, where the energy store is additionally enclosed on the circumference like a collar by a jacket shield.

FIGS. 3 and 4 show the energy store 16 with the antenna element 18 and with the shield 44 in an illustration according to FIG. 2 and in a side view, respectively. In the embodiment shown in FIG. 3, the circumferential region 30 of the energy store 16 between its end sides 28 is completely enclosed by a collar-like jacket shield 48. In other words, the jacket shield 48 is formed along the longitudinal direction L such that the entire circumferential region 30 of the energy store 16 is covered by the jacket shield 48. The jacket shield 48 is arranged between the shield 44 attached at the first and second foil elements 34 and 36 of the foil structure 32.

According to the embodiment of FIG. 4, the circumferential region 30 of the energy store 16 is only partially enclosed by the collar-like jacket shield 48. The jacket shield 48 is arranged centrally in this case between the shield 44 attached at the first and second foil elements 34 and 36 and spaced apart therefrom. In both embodiments according to FIGS. 3 and 4, the jacket shield 48 is arranged between the third foil element 38 and the energy store 16.

The jacket shield 48 is a component of the shield 44 and is preferably made of the material of the shield 44, which is arranged between the first or second foil element 34 or 36, respectively, and the energy store 16. The jacket shield 44 is embodied here as a copper foil.

By means of the foil structure 32 and also by means of the shield 44 between the first and/or second foil element 34, 36 and the energy store 16 and by means of the jacket shield 48, a penetration of magnetic fields into the energy store 16 is avoided, and therefore eddy current losses of the magnetic alternating field are induced if at all and only slightly in the shield 44. As a result, heating of the energy store 16 is avoided. Because of the collar-like embodiment of the jacket shield 48, the replaceability of the energy store 16 is furthermore maintained.

Figure 5:
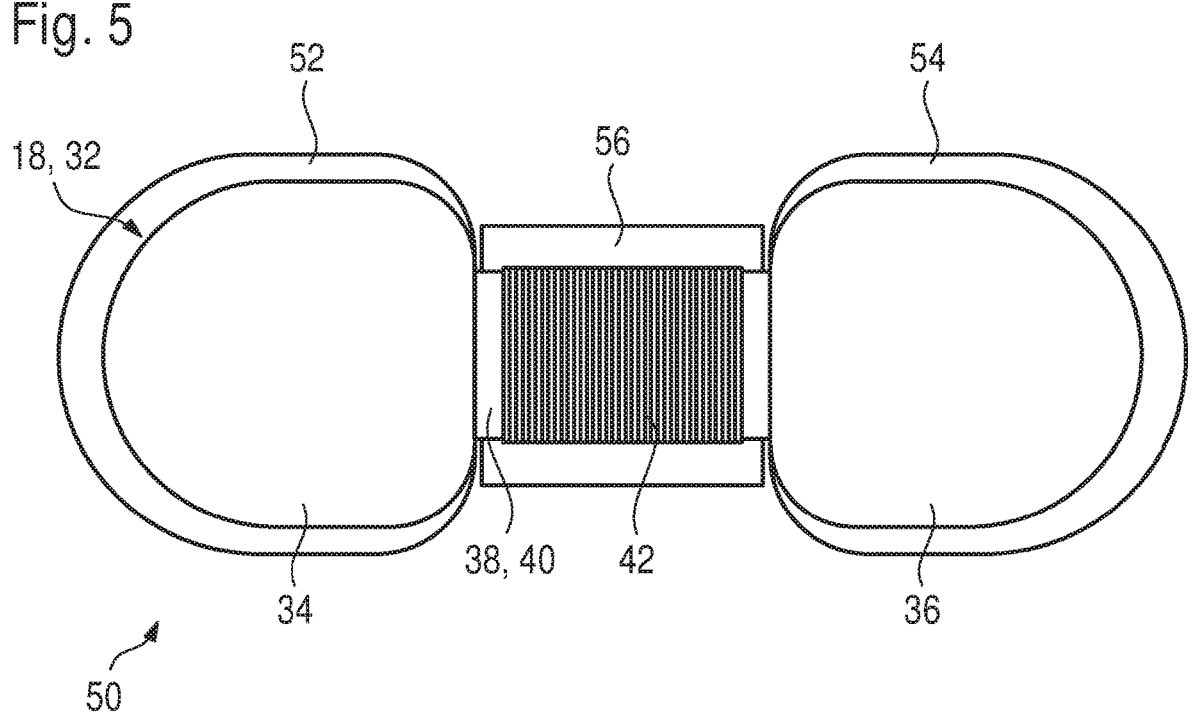
FIG. 5 is a top view of the foil-type antenna element arranged on a flexible printed circuit board, having a first and second foil element on both sides of a coil core bearing a wire or coil winding.

FIG. 5 shows a top view of the antenna element 18 arranged on a flexible printed circuit board 50 having the first and second foil elements 34 and 36, respectively, and the wire or coil winding 42 about the third foil element 38 embodied as a coil core 40 in a flat embodiment before the installation. The flexible printed circuit board 50 has in this case a first region 52, a second region 54, and also a third region 56, wherein the first, the second, and the third regions 52, 54, and 56 are formed coherently. The first, the second, and the third foil elements 34, 36, and 38 of the foil structure 32 are arranged thereon. The shield 44 is embodied in this case as a copper ply of the flexible printed circuit board 50, whereby a simple and stable production of the shield is provided.

For the installation of the antenna element 18 and the flexible printed circuit board 50 on the energy store 16, firstly angling of the first and second foil elements of the foil structure and the regions arranged thereon of the flexible printed circuit board 54 and 56 takes place in a suitable manner. Simultaneously or subsequently, the first and second foil elements 34, 36 of the foil structure 30 and also the first and second regions 52, 54 of the flexible printed circuit board 50 are arranged at the end sides 28 of the energy source 16. In this case, the printed circuit board 50 facing toward the energy store 16 completely covers the end sides 28 of the energy source 16.

Figure 6:
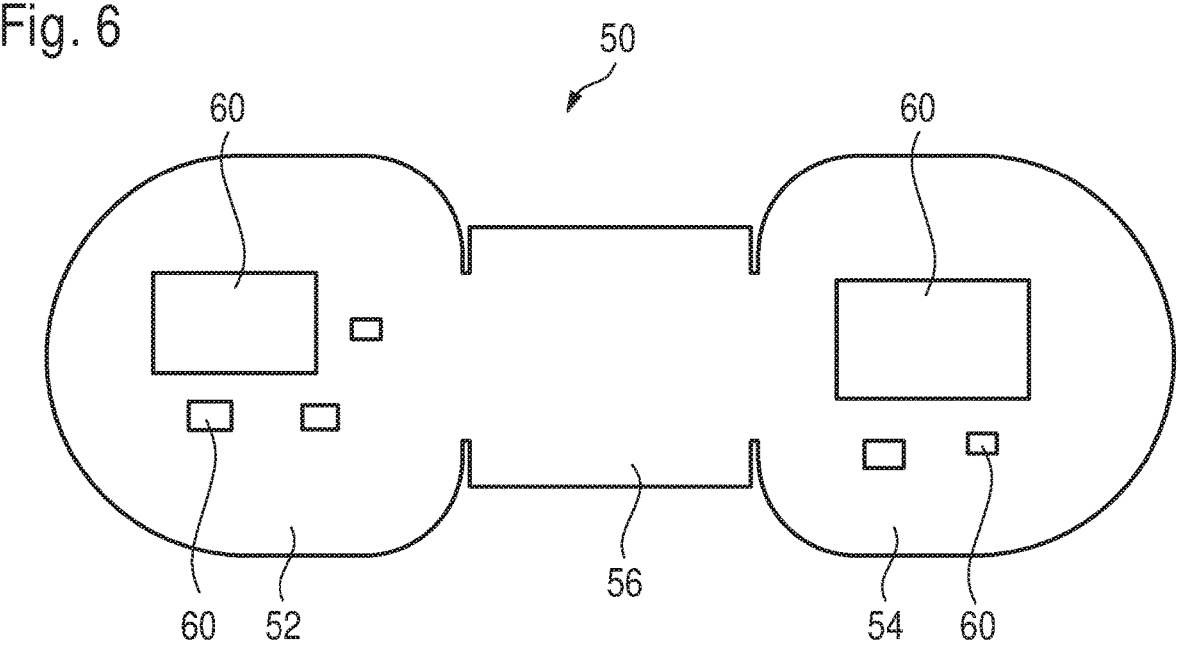
FIG. 6 is a rear view of a board rear side of the flexible printed circuit board according to FIG. 5, which faces toward the energy store in the installed state, having electronic components of a transmitting and/or receiving unit of the hearing aid.

FIG. 6 shows a top view of the side of the flexible printed circuit board 50 from FIG. 5 facing away from the foil structure 32 or facing toward the energy store 16, respectively, in the installed state. Further electronic hearing aid components 60, for example a component of the transmitting and/or receiving unit 19, a charging electronics unit, or terminals for the energy store 16 are on the flexible printed circuit board 50. They are attached essentially centrally in the first and second regions 52 and 54 of the flexible printed circuit board 50. Because of the shield 44, the electronic components 60 are shielded from magnetic fields, and interference with the antenna element 18 due to possible magnetic fields, which are induced as a result of operation in the hearing aid component 60, is reduced.

FIG. 7 shows a perspective view of the first and second foil elements 34, 36 arranged at the end sides 28 of the energy store 16 and also a hearing aid circuit board 62. The first and second foil elements 34, 36 of the foil structure are arranged at a first region 64 or at a second region 66, respectively, of the hearing aid circuit board 62. The circuit board regions 64, 66 of the hearing aid circuit board 62 are arranged at the end sides 28 of the energy store 16, wherein the shield 44 is embodied as copper plies 58 of the circuit board or printed circuit board 62. The third foil element 38, which forms the coil core 40 of the antenna element 18, is integrated here in a third region 68 of the hearing aid circuit board 62. It bears further components 70 of the hearing assistance aid 4, in particular amplifier circuits and/or electronic components.

Figure 8:
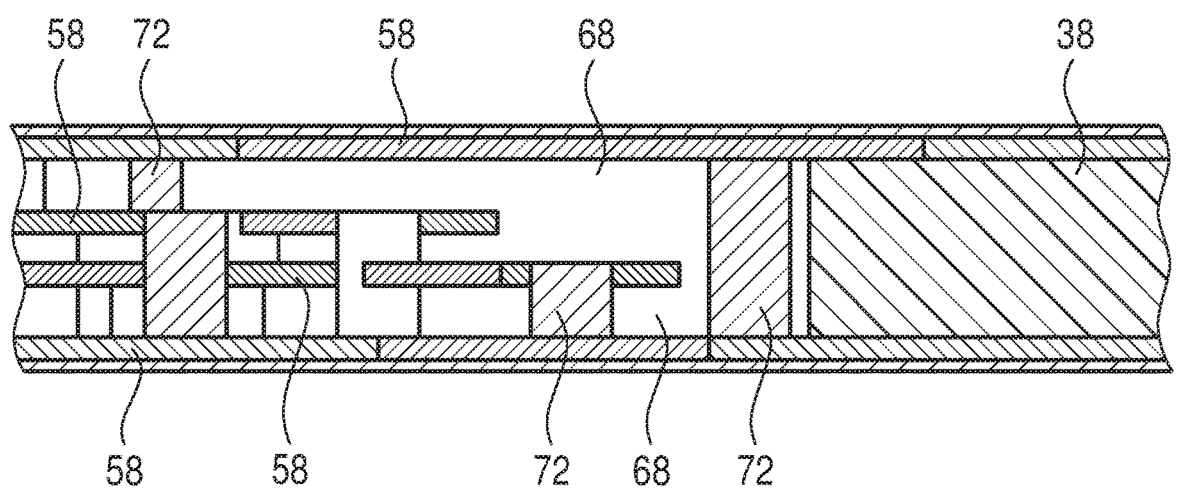
FIG. 8 is an enlarged sectional view of a detail of the hearing aid circuit board along section line VIII-VIII of FIG. 7 having a third foil element of the antenna element of a copper ply of the circuit board.

FIG. 8 shows a sectional illustration of the region of the third region 68 of the hearing aid circuit board 62 between lines VIII-VIII from FIG. 7. The third foil element 38 of the foil structure 32, which forms the coil core 40 of the antenna element 18, is integrated into the hearing aid circuit board 62. In this case, the wire or coil winding 42 is formed from conductor tracks of the hearing aid circuit board 62, which are electrically contacted by means of through contacts 72, whereby a complex and sensitive winding of the wire or coil winding 42 is avoided. The shield 44 is embodied in this case by means of the copper ply 58 of the hearing aid circuit board 50.

The invention is not restricted to the above-described exemplary embodiments. Rather, other variants of the invention can also be derived therefrom by a person skilled in the art, without leaving the subject matter of the invention. In particular, all individual features described in conjunction with the exemplary embodiments are furthermore also combinable with one another in another manner, without leaving the subject matter of the invention.

The following is a summary list of reference numerals and the corresponding structure used in the above description of the invention:

2 hearing aid system
4 hearing aid/hearing assistance aid
6 housing
8 microphone
10 sound transducer
12 signal processing unit
14 loudspeaker
16 energy store
18 antenna element
19 transmitting and/or receiving unit
20 wireless signal transmission
22 further device 24 arrow/radio communication
26 arrow/energy transfer
27 charging device
28 end side
30 circumferential region
32 foil structure
34 first foil element
36 second foil element
38 third foil element
40 coil core
42 wire or coil winding
44 shield
46 copper foil
48 jacket shield
50 flexible printed circuit board
52 first region of the printed circuit board
54 second region of the printed circuit board
56 third region of the printed circuit board
58 copper ply
60 electronic hearing aid component
62 hearing aid circuit board/printed circuit board
64 first region of the hearing aid circuit board
66 second region of the hearing aid circuit board
68 third region of the hearing aid circuit board
70 components of the hearing aid
72 through contact
L longitudinal direction

The invention claimed is:

1. A hearing aid, comprising:
an energy store having opposing end sides;
a transmitting and/or receiving unit having an antenna element for wireless signal transmission and for wireless energy transfer to said energy store, said antenna element being formed as a foil structure which at least sectionally encloses said energy store, said foil structure formed from a ferromagnetic or ferrimagnetic material, said foil structure having a first foil element, a second foil element and a third foil element, said first and second foil elements are disposed at said opposing end sides of said energy store and said third foil element overlapping a circumferential region of said energy store;
said third foil element forming a coil core of said antenna element and having a wire or coil winding; and
said first and/or second foil elements at least partially cover a respective one of said opposing end sides of said energy store.

2. The hearing aid according to claim 1, further comprising a shield disposed between said foil structure of said antenna element and said energy store.

3. The hearing aid according to claim 2, wherein said shield is formed from a diamagnetic or paramagnetic material, or contains said diamagnetic or paramagnetic material.

4. The hearing aid according to claim 2, wherein said shield is at least partially covered by said foil structure of said antenna element.

5. A hearing aid, comprising:
an enemy store;
a transmitting and/or receiving unit having an antenna element for wireless signal transmission and for wireless enemy transfer to said enemy store, said antenna element being formed as a foil structure which at least sectionally encloses said energy store;
a shield disposed between said foil structure of said antenna element and said energy store;
an electronic hearing aid component; and
a flexible printed circuit board having a board surface, said shield being introduced into said flexible printed circuit board, said flexible printed circuit board bearing said electronic hearing aid component on said board surface facing toward said energy store.

6. The hearing aid according to claim 5, wherein said foil structure is at least partially integrated into said flexible printed circuit board bearing said electronic hearing aid component.

7. The hearing aid according to claim 2, wherein said shield has a collar-shaped jacket shield and said energy store is at least partially enclosed by said collar-shaped jacket shield.

8. The hearing aid according to claim 1, wherein the hearing aid is a behind-the-ear hearing assistance aid.

9. The hearing aid according to claim 1, wherein said first and/or second foil elements cover at least half of an end side surface of said respective opposing end side.

10. The hearing aid according to claim 3, wherein said diamagnetic or paramagnetic material is copper.

* * * * *